United States Patent
Liu et al.

(10) Patent No.: US 12,316,038 B2
(45) Date of Patent: May 27, 2025

(54) CONTACT CONNECTOR AND ELECTRONIC DEVICE

(71) Applicant: BEIJING XIAOMI MOBILE SOFTWARE CO., LTD., Beijing (CN)

(72) Inventors: Jinbiao Liu, Beijing (CN); Jianbo Zhou, Beijing (CN); Licheng Yu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 342 days.

(21) Appl. No.: 17/877,852

(22) Filed: Jul. 29, 2022

(65) Prior Publication Data

US 2023/0299524 A1    Sep. 21, 2023

(30) Foreign Application Priority Data

Mar. 18, 2022 (CN) .................. 202220607984.X

(51) Int. Cl.
| | |
|---|---|
| *H01R 13/05* | (2006.01) |
| *H01R 12/71* | (2011.01) |
| *H01R 13/03* | (2006.01) |
| *H01R 13/50* | (2006.01) |

(52) U.S. Cl.
CPC ............ *H01R 13/05* (2013.01); *H01R 13/03* (2013.01); *H01R 13/50* (2013.01); *H01R 12/716* (2013.01)

(58) Field of Classification Search
CPC .............................. H01R 13/50; H01R 12/716
USPC .................................................. 439/825, 862
See application file for complete search history.

(56) References Cited

U.S. PATENT DOCUMENTS

| | | | |
|---|---|---|---|
| 5,527,192 A | 6/1996 | Juret | |
| 7,824,225 B1 | 11/2010 | Wang | |
| 8,801,476 B2* | 8/2014 | Zhang | .............. H01R 13/26 |
| | | | 439/862 |
| 2017/0054242 A1 | 2/2017 | Wang et al. | |

FOREIGN PATENT DOCUMENTS

| | | |
|---|---|---|
| EP | 0926769 A1 | 6/1999 |
| EP | 3767162 A1 | 1/2021 |
| FR | 2787245 A1 | 6/2000 |

OTHER PUBLICATIONS

Extended European Search Report of EP Application No. 22187761.6 dated May 22, 2023, (9p).

\* cited by examiner

*Primary Examiner* — Gary F Paumen
(74) *Attorney, Agent, or Firm* — Arch & Lake LLP; Hao Tan; Shen Wang

(57) ABSTRACT

A contact connector is provided. The contact connector includes a substrate and a metal elastic sheet, the substrate includes a first side and a second side opposite to each other, the metal elastic sheet includes a fixed section and a free section connected with each other, the fixed section is fixed to the substrate, the free section is provided with a connection contact, the substrate is provided with a through hole penetrating through the first side and the second side, the connection contact penetrates through the through hole to protrude out of the first side, and the second side is provided with a mounting portion used for assembling with the electronic device.

19 Claims, 4 Drawing Sheets

CONTACT CONNECTOR AND ELECTRONIC DEVICE

CROSS REFERENCE TO RELATED APPLICATION

The present application claims the benefit of priority to Chinese Application No. 202220607984.X, filed on Mar. 18, 2022, the contents of which are incorporated herein by reference in their entireties for all purposes.

BACKGROUND

With the rapid development of charging technologies, in order to charge an electronic device more conveniently and quickly, the electronic device is charged in a way that an exposed charging contact is matched with a charging base.

SUMMARY

The disclosure relates to the technical field of electronic devices, in particular to a contact connector and an electronic device.

According to a first aspect of the disclosure, a contact connector is provided and includes a substrate and a metal elastic sheet. The substrate includes a first side and a second side opposite to each other, the metal elastic sheet includes a fixed section and a free section connected with each other, the fixed section is fixed to the substrate, the free section includes a connection contact, the substrate includes a through hole penetrating through the first side and the second side, the connection contact penetrates through the through hole to protrude out of the first side, and the second side includes a mounting portion configured to assemble with an electronic device.

According to a second aspect of the disclosure, an electronic device includes a contact connector. The contact connector includes a substrate and a metal elastic sheet, the substrate includes a first side and a second side opposite to each other, the metal elastic sheet includes a fixed section and a free section connected with each other, the fixed section is fixed to the substrate, the free section includes a connection contact, the substrate includes a through hole penetrating through the first side and the second side, the connection contact penetrates through the through hole to protrude out of the first side, and the second side includes a mounting portion configured to assemble with the electronic device.

Other features and advantages of the disclosure will be described in detail in the subsequent detailed description.

BRIEF DESCRIPTION OF THE DRAWINGS

The accompanying drawings are intended to provide a further understanding of the disclosure, form a part of the description, and are used to explain the disclosure together with the following detailed description, but do not constitute a limitation to the disclosure. In the accompanying drawings.

DETAILED DESCRIPTION

Figure 1:
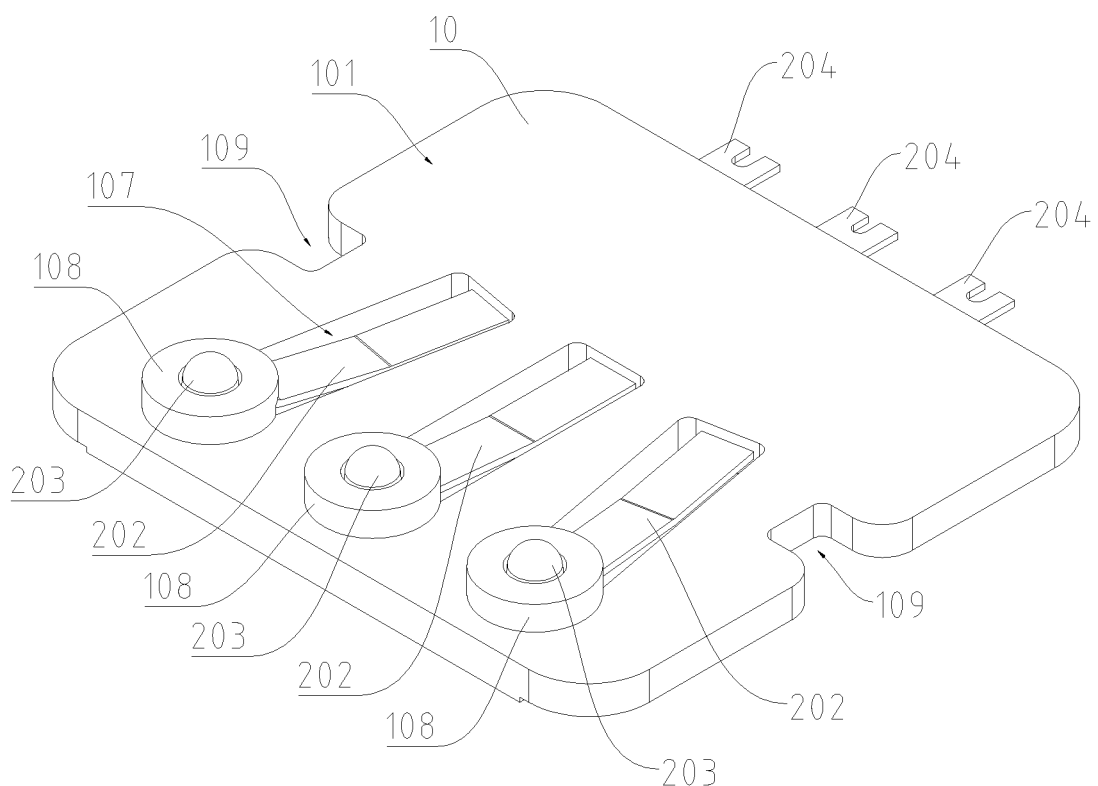
FIG. 1 is a schematic stereoscopic diagram of a contact connector provided by some examples of the disclosure.

The detailed description of the disclosure is described in detail below in combination with the accompanying drawings. It should be understood that the detailed description described herein is only used to illustrate and explain the disclosure and are not used to limit the disclosure.

In the disclosure, without any contrary explanation, the terms used in the disclosure such as "first" and "second" are to distinguish one element from another, and do not have order and importance. In addition, in the following description, when the accompanying drawings are involved, unless otherwise indicated, the same reference numerals in different drawings indicate the same or similar elements. The above definitions are only used to explain and illustrate the disclosure, and shall not be interpreted as limitations to the disclosure.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In the related art, a contact connector is formed by assembling a housing and two cover plates, and when the contact connector is applied to the electronic device, the cover plates and the electronic device are fixed. Since the structure of the contact connector is thick, a large space needs to be reserved in the electronic device for mounting of the contact connector, which affects the development of the electronic device towards the direction of thinning.

The objects of the disclosure are to provide a contact connector and an electronic device so as to reduce a thickness of the contact connector, which is conductive to thinning of the electronic device.

According to some examples of the disclosure, referring to FIG. 1 to FIG. 6, a contact connector is provided. The contact connector includes a substrate 10 and metal elastic sheets 20, the substrate 10 includes a first side 101 and a second side 102 opposite to each other, the metal elastic sheets 20 include fixed sections 201 and free sections 202 connected with each other, the fixed sections 201 are fixed to the substrate 10, the free sections 202 are provided with connection contacts 203, the substrate 10 is provided with through holes 103 penetrating through the first side 101 and the second side 102, the connection contacts 203 penetrate through the through holes 103 to protrude out of the first side 101, and the second side 102 is provided with mounting portions 104 configured to assemble with an electronic device 100.

By means of the above technical solution, when the contact connector provided by the disclosure is assembled on a fitting or an accessory in the electronic device 100, the mounting portions 104 on the second side 102 of the substrate 10 are configured to be assembled with the electronic device 100, in this way, the substrate 10 can be directly assembled with the electronic device 100 without other structural parts for assembling with the electronic device 100, so that the contact connector does not need to include other structural parts, the quantity of parts of the contact connector can be reduced, and the thickness of the contact connector can be lowered, which is conductive to thinning of the electronic device 100. After the contact connector is assembled with the fitting or the accessory in the electronic device 100, the connection contacts 203 on the metal elastic sheets 20 are exposed to the electronic device 100 so as to be able to make contact with exposed metal connection points of another electronic device 100, so that the two electronic devices are electrically connected to realize the functions of charging or data transmission or the like.

In some examples, the contact connector may include a plurality of metal elastic sheets 20, the plurality of metal elastic sheets 20 are arranged at intervals, and the connection contacts 203 of the plurality of metal elastic sheets 20 are colinear, that is, the connection contacts 203 of the plurality of metal elastic sheets 20 are located on the same straight line, the same arc or any curve, in other words, the arrangement of the connection contacts 203 of the plurality of metal elastic sheets 20 may have any appropriate design according to actual requirements, which is not specifically limited in the disclosure. The fixed sections 201 of the plurality of metal elastic sheets 20 are arranged in parallel, and the free section 202 and the fixed section 201 of at least one of the metal elastic sheets 20 are arranged with an obtuse angle or an acute angle therebetween.

Figure 2:
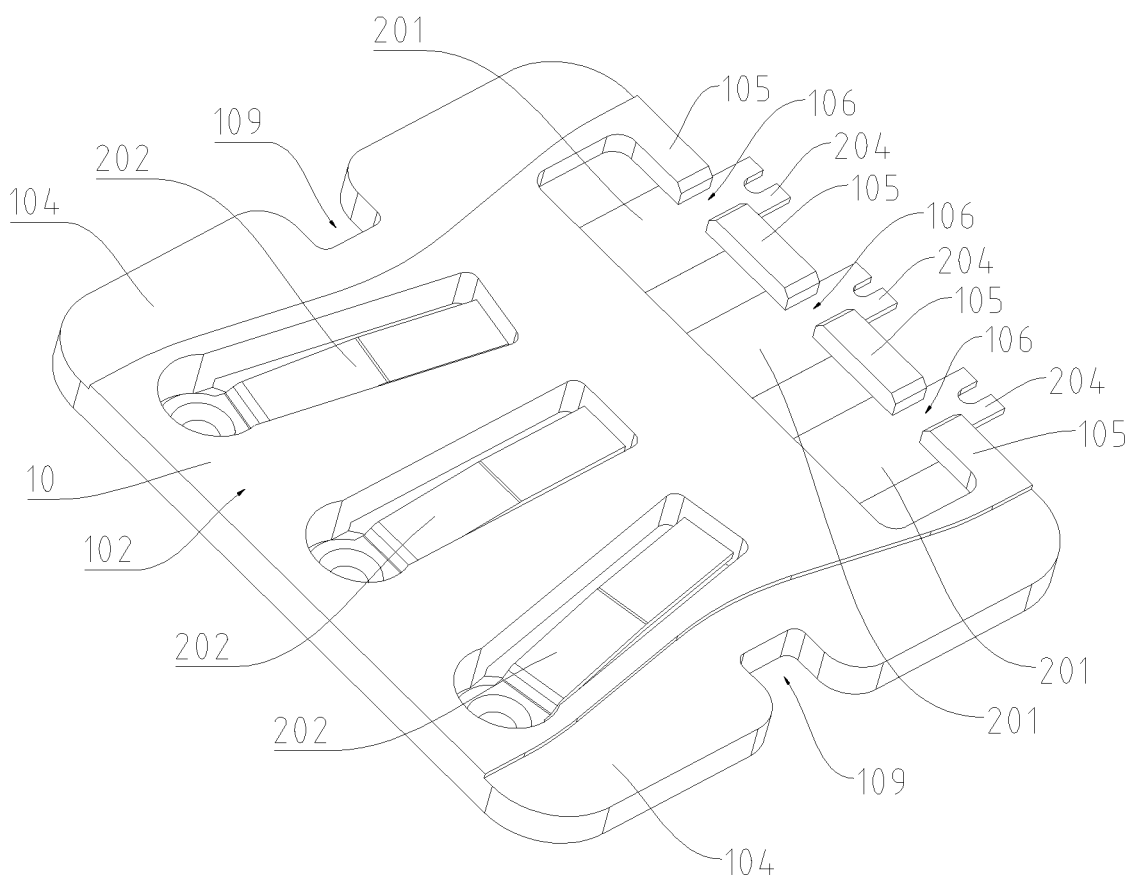
FIG. 2 is another schematic stereoscopic diagram of a contact connector provided by some examples of the disclosure.
Figure 3:
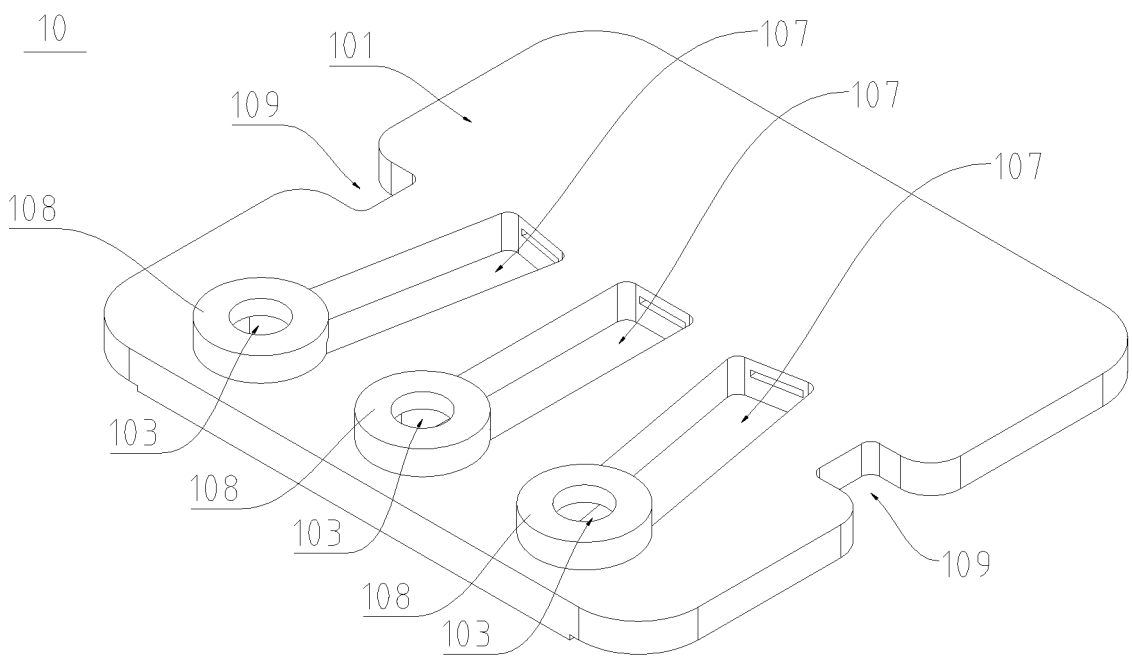
FIG. 3 is a schematic stereoscopic diagram of a substrate in a contact connector provided by some examples of the disclosure.
Figure 5:
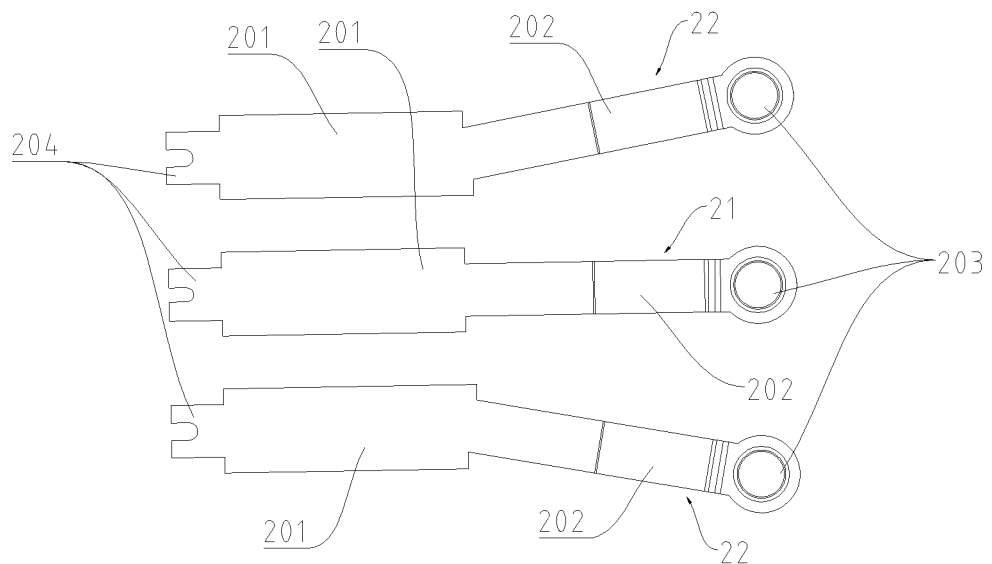
FIG. 5 is a schematic structural diagram of a metal elastic sheet in a contact connector provided by some examples of the disclosure.
Figure 6:
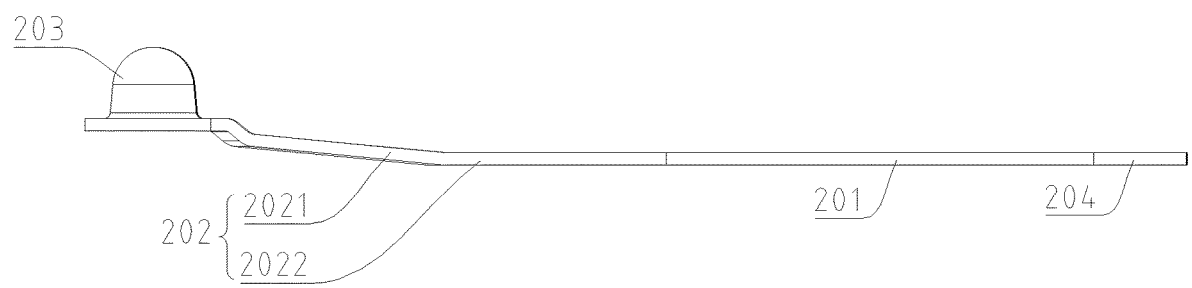
FIG. 6 is another schematic structural diagram of a metal elastic sheet in a contact connector provided by some examples of the disclosure.

The layout of the metal elastic sheets 20 may be flexibly changed according to actual requirements, for example, in an example shown in FIG. 1, FIG. 2 and FIG. 5, the quantity of the metal elastic sheets 20 may be three, the metal elastic sheets include a middle metal elastic sheet 21 and side metal elastic sheets 22 located on two sides of the middle metal elastic sheet 21, an included angle between a free section 202 and a fixed section 201 of the middle metal elastic sheet 21 is 0°, and an included angle between free sections 202 and fixed sections 201 of the two side metal elastic sheets 22 is an obtuse angle or an acute angle. In the disclosure, the included angle between the free sections 202 and the fixed sections 201 of the side metal elastic sheets 22 may be any angle in intervals of 1° to 89° or 91° to 179°, which is not specifically limited in the disclosure. In addition, the two side metal elastic sheets 22 may have different shapes, that is, the included angles between the free sections 202 and the fixed sections 201 of the two side metal elastic sheets 22 are different. For example, in an implementation, the included angle between the free section 202 and the fixed section 201 of one of the side metal elastic sheets 22 may be an obtuse angle, such as 130°, and the included angle between the free section 202 and the fixed section 201 of the other side metal elastic sheet 22 may also be an obtuse angle 145°. In another implementation, the included angle between the free section 202 and the fixed section 201 of one of the side metal elastic sheets 22 may be an obtuse angle, such as 125°, and the included angle between the free section 202 and the fixed section 201 of the other side metal elastic sheet 22 may be an acute angle, such as 60°. In yet another implementation, the included angle between the free section 202 and the fixed section 201 of one of the side metal elastic sheets 22 may be an acute angle, such as 75°, which is also not specifically limited in the disclosure.

In addition, in the example shown in FIG. 1, FIG. 2 and FIG. 5, the two side metal elastic sheets 22 may be symmetrically arranged with respect to the middle metal elastic sheet 21, and the two side metal elastic sheets 22 may also be arranged on two sides of the middle metal elastic sheet 21 in parallel.

Figure 4:
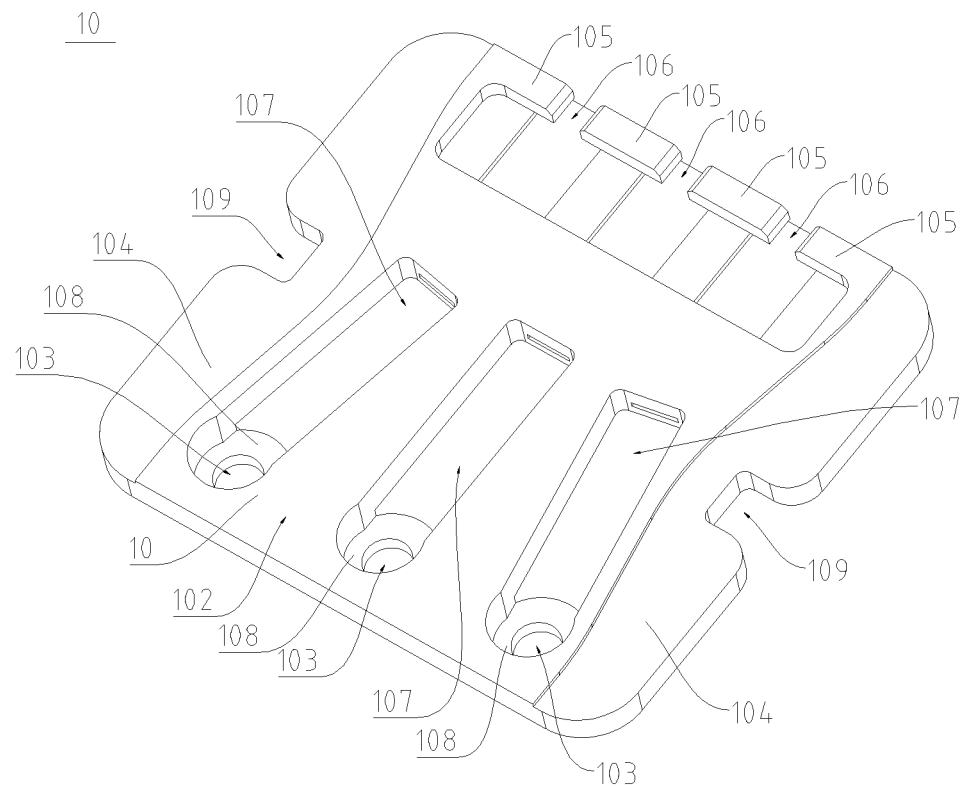
FIG. 4 is another schematic stereoscopic diagram of a substrate in a contact connector provided by some examples of the disclosure.

In some examples, referring to FIG. 2 and FIG. 4, in order to reliably assemble the contact connector and the electronic device 100, the mounting portions 104 may be disposed on two opposite side portions of the substrate 10 respectively.

The mounting portions 104 may be constructed in any appropriate way. Alternatively, referring to FIG. 2 and FIG. 4, the mounting portions 104 may be constructed as glue accommodating grooves, the glue accommodating grooves are concave from the second side 102 to the first side 101 and extend in a direction parallel to a length direction of the metal elastic sheets 20, and the glue accommodating grooves are configured to accommodate an adhesive to fix the substrate 10 and the electronic device 100. In other implementations, the mounting portions 104 may also be constructed as threaded holes, and in this case, fasteners (e.g., screws and pins) penetrate through the threaded holes to fix the substrate 10 and the electronic device 100. In some other implementations, the substrate 10 and the electronic device 100 may be assembled together through buckles and clamping grooves matched with each other, and in this case, the mounting portions 104 may be provided with one of the buckles and clamping grooves, the electronic device 100 is provided with another one of the buckles and the clamping grooves, and thus the substrate 10 and the electronic device 100 are connected in a clamped mode. In addition, the substrate 10 may also be assembled to the electronic device 100 in other appropriate ways, which is not specifically limited in the disclosure.

In some examples, the fixed sections 201 may be fixed to the substrate 10 in any appropriate way. Alternatively, the fixed sections 201 are fixed on the substrate 10 through injection molding, part of the fixed sections 201 are exposed to the substrate 10, and as shown in FIG. 2, the parts of the fixed sections 201 exposed to the substrate 10 may be configured to be electrically connected with the electronic device 100.

The fixed sections 201 and the electronic device 100 may have two electric connection manners.

In some examples, the parts of the fixed sections 201 exposed to the substrate 10 may be connected with a printed circuit board (PCB) or a flexible printed circuit (FPC) of the electronic device 100 through bonding wires. In this implementation, in order to make the layout of the bonding wires more orderly and attractive, the second side 102 may be provided with a plurality of limiting bumps 105. Referring to FIG. 2 and FIG. 4, the plurality of limiting bumps 105 are arranged at intervals in a direction perpendicular to the fixed sections 201, a wire clamping groove 106 configured to limit the bonding wires is formed between every two adjacent limiting bumps 105, and the wire clamping grooves 106 are used to clamp the bonding wires in the wire clamping grooves 106 to achieve limiting of the bonding wires.

In some examples, referring to FIG. 2, the metal elastic sheets 20 are provided with weld leg portions 204 for welding with the circuit board of the electronic device 100, the weld leg portions 204 extend away from the fixed sections 201 from ends of the fixed sections 201 so as to protrude out of the substrate 10, and the weld leg portions 204 are used for direct welding connection with the PCB or the FPC of the electronic device 100.

In some examples, referring to FIG. 1 and FIG. 2, the substrate 10 may be provided with hollowed-out portions 107 and bosses 108 located at one ends of the hollowed-out portions 107, the free sections 202 are located at the hollowed-out portions 107, and the bosses 108 protrude from the first side 101 facing away from the second side 102 and are provided with the through holes 103. When the connection contacts 203 make contact with exposed metal connection points of another electronic device, the connection contacts 203 sink towards the second side 102 of the substrate 10 under acting force, the connection contacts 203 transfer the acting force to the free sections 202, since the metal elastic sheets 20 have elasticity, the free sections 202 elastically deform after being subjected to the acting force and provide elasticity to the connection contacts 203, the elasticity makes the connection contacts 203 move towards the first side 101 of the substrate 10, and thus the connection contacts 203 and the exposed metal connection points of another electronic device are kept in contact, which guarantees the stability of a charging process or a data transmission process.

In some examples, the free sections 202 may be constructed in any appropriate way. Alternatively, referring to FIG. 6, the free sections 202 may include first sections 2021 and second sections 2022. The second sections 2022 are connected with the fixed sections 201, the first sections 2021 are bent from ends of the second sections 2022 towards the first side 101 of the substrate 10, and thus the connection contacts 203 may be raised, so that the connection contacts 203 protrude out of the first side 101 of the substrate 10 more largely. In addition, in practical applications, when the connection contacts 203 do not need to be raised, the free sections 202 do not need to be bent, that is, the first sections 2021 and the second sections 2022 are located at the same horizontal plane.

Figure 7:
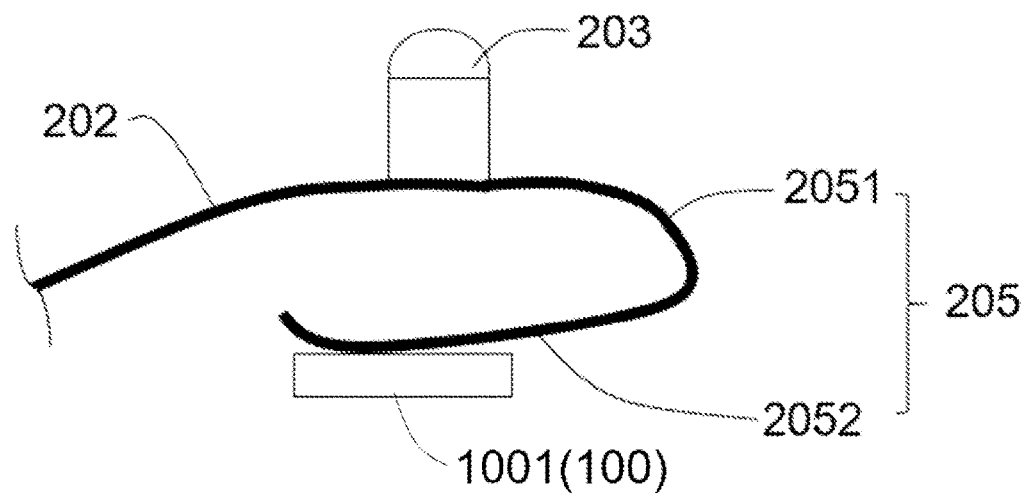
FIG. 7 is a schematic structural diagram of a metal elastic sheet in a contact connector provided by another examples of the disclosure.

In some examples, referring to FIG. 7, the metal elastic sheets 20 further include simple support sections 205, the simple support sections 205 include first segments 2051 and second segments 2052 connected with each other, the first segments 2051 extend away from the fixed sections 201 from ends of the free sections 202, the second segments 2052 are bent from ends of the first segments 2051 towards the second side 102 and extend towards the fixed sections 201, and the second segments 2052 are configured to support the electronic device 100 to provide the connection contacts 203 with force towards the first side 101, so that the connection contacts 203 can be kept in contact with the metal connection points of another electronic device 100. The second segments 2052 may support supporting parts 1001 in the electronic device 100, and the supporting parts 1001 may be any appropriate structural parts in the electronic device 100, which is not specifically limited in the disclosure.

In some examples, referring to FIG. 1 to FIG. 4, the substrate 10 may be provided with clamping portions 109, and the clamping portions 109 are configured to be matched with the electronic device 100 in a limiting mode to position the substrate 10. The two sides of the substrate 10 may be each provided with one clamping portion 109, and the two clamping portions 109 may limit deflection of the substrate 10 relative to the electronic device 100 to guarantee the reliability of fixing of the substrate 10 and the electronic device 100.

On the basis of the above technical solution, the disclosure further provides an electronic device 100, and the electronic device 100 is provided with the above contact connector, which is conductive to thinning. The electronic device 100 may be a mobile terminal, such as a mobile phone, a tablet, a notebook, etc. The electronic device 100 may also be a computer, a television, a charging base and other electronic devices, which is not specifically limited in the disclosure. In addition, the electronic device 100 provided by the disclosure also has the above characteristics, which is omitted here to avoid repetition.

The preferred implementations of the disclosure are described in detail above in combination with the accompanying drawings. However, the disclosure is not limited to the specific details of the above implementations. Within the scope of the technical concept of the disclosure, a variety of simple modifications can be made to the technical solutions of the disclosure, and these simple modifications belong to the protection scope of the disclosure.

In addition, it should be noted that the specific technical features described in the above detailed description can be combined in any suitable way without contradiction. In order to avoid unnecessary repetition, various possible combination methods will not be described separately in the disclosure.

In addition, various different implementations of the disclosure may also be combined arbitrarily. As long as they do not violate the idea of the disclosure, they should also be regarded as the contents disclosed in the disclosure.

In some examples, a contact connector is provided. The contact connector may include a substrate and a metal elastic sheet, the substrate may include a first side and a second side opposite to each other, the metal elastic sheet may include a fixed section and a free section connected with each other, the fixed section is fixed to the substrate, the free section may be provided with or may include a connection contact, the substrate may be provided with or may include a through hole penetrating through the first side and the second side, the connection contact penetrates through the through hole to protrude out of the first side, and the second side may be provided with or may include a mounting portion used for assembling with an electronic device.

In some examples, the contact connector may include a plurality of metal elastic sheets including the metal elastic sheet discussed above. The plurality of metal elastic sheets may be arranged at intervals, connection contacts of the plurality of metal elastic sheets may be colinear, fixed sections of the plurality of metal elastic sheets may be arranged in parallel, and the free section and the fixed section of at least one of the metal elastic sheets may be arranged with an obtuse angle or an acute angle therebetween.

In some examples, the plurality of metal elastic sheets may be three. The metal elastic sheets may include a middle metal elastic sheet and two side metal elastic sheets located on two sides of the middle metal elastic sheet, an included angle between a free section and a fixed section of the middle metal elastic sheet may be 0°, and an included angle between a free section and a fixed section of one of the two side metal elastic sheets may be an obtuse angle or an acute angle.

In some examples, the two side metal elastic sheets may be symmetrically arranged with respect to the middle metal elastic sheet.

In some examples, mounting portions may be disposed on two opposite side portions of the substrate respectively, the mounting portions may be constructed as or include glue accommodating grooves, the glue accommodating grooves may concave from the second side to the first side and extend in a direction parallel to a length direction of the metal elastic sheet, and the glue accommodating grooves may be configured to accommodate an adhesive to fix the substrate and the electronic device.

In some examples, the fixed section is fixed on the substrate through injection molding, and a part of the fixed section is exposed to the substrate.

In some examples, the second side may be provided with or include a plurality of limiting bumps, the plurality of limiting bumps may be arranged at intervals in a direction perpendicular to the fixed section, and a wire clamping groove configured to limit a bonding wire may be formed between every two adjacent limiting bumps.

In some examples, the metal elastic sheet may be provided with or include a weld leg portion configured to be welded to a circuit board of the electronic device, and the weld leg portion may extend away from the fixed section from an end of the fixed section to protrude out of the substrate.

In some examples, the substrate may be provided with or include a hollowed-out portion and a boss located at one end of the hollowed-out portion, the free section may be located at the hollowed-out portion, and the boss may protrude from the first side facing away from the second side and may be provided with or include the through hole.

In some examples, the metal elastic sheet may further include a simple support section, the simple support section may include a first segment and a second segment connected with each other, the first segment may extend away from the fixed section from an end of the free section, the second segment may be bent from an end of the first segment towards the second side and extend towards the fixed section, and the second segment may be configured to support the electronic device to provide the connection contact with force towards the first side.

In some examples, the substrate may be provided with or include a clamping portion, and the clamping portion may be configured to match with the electronic device in a limiting mode.

In some examples, an electronic device may be provided with the contact connector according to any contact connector as discussed above.

What is claimed is:

1. A contact connector, comprising:
a substrate and a metal elastic sheet, wherein the substrate comprises a first side and a second side opposite to each other, the metal elastic sheet comprises a fixed section and a free section connected with each other, the fixed section is fixed to the substrate, the free section comprises a connection contact, the substrate comprises a through hole penetrating through the first side and the second side, the connection contact penetrates through the through hole to protrude out of the first side, and the second side comprises a mounting portion configured to assemble with an electronic device, wherein the substrate comprises a hollowed-out portion and a boss located at one end of the hollowed-out portion, the free section is located at the hollowed-out portion, and the boss protrudes from the first side facing away from the second side and comprises the through hole.

2. The contact connector according to claim 1, wherein the contact connector comprises a plurality of metal elastic sheets comprising the metal elastic sheet, the plurality of metal elastic sheets are arranged at intervals, connection contacts of the plurality of metal elastic sheets are colinear, fixed sections of the plurality of metal elastic sheets are arranged in parallel, and the free section and the fixed section of at least one of the metal elastic sheets are arranged with an obtuse angle therebetween.

3. The contact connector according to claim 2, wherein the plurality of metal elastic sheets comprise three metal elastic sheets comprising a middle metal elastic sheet and two side metal elastic sheets located on two sides of the middle metal elastic sheet, an included angle between the free section and the fixed section of the middle metal elastic sheet is 0°, and an included angle between the free section and the fixed section of a side metal elastic sheet is an obtuse angle.

4. The contact connector according to claim 3, wherein the two side metal elastic sheets are symmetrically arranged with respect to the middle metal elastic sheet.

5. The contact connector according to claim 1, wherein the contact connector comprises a plurality of metal elastic sheets comprising the metal elastic sheet, the plurality of metal elastic sheets are arranged at intervals, connection contacts of the plurality of metal elastic sheets are colinear, fixed sections of the plurality of metal elastic sheets are arranged in parallel, and the free section and the fixed section of at least one of the metal elastic sheets are arranged with an acute angle therebetween.

6. The contact connector according to claim 5, wherein the plurality of metal elastic sheets comprise three metal elastic sheets comprising a middle metal elastic sheet and two side metal elastic sheets located on two sides of the middle metal elastic sheet, an included angle between the free section and the fixed section of the middle metal elastic sheet is 0°, and an included angle between the free section and the fixed section of a side metal elastic sheets is an acute angle.

7. The contact connector according to claim 6, wherein the two side metal elastic sheets are symmetrically arranged with respect to the middle metal elastic sheet.

8. The contact connector according to claim 1, wherein mounting portions are disposed on two opposite side portions of the substrate respectively, the mounting portions comprise glue accommodating grooves, the glue accommodating grooves are concave from the second side to the first side and extend in a direction parallel to a length direction of the metal elastic sheet, and the glue accommodating grooves are configured to accommodate an adhesive to fix the substrate and the electronic device.

9. The contact connector according to claim 1, wherein the fixed section is fixed on the substrate through injection molding, and a part of the fixed section is exposed to the substrate.

10. The contact connector according to claim 9, wherein the second side comprises a plurality of limiting bumps, the plurality of limiting bumps are arranged at intervals in a direction perpendicular to the fixed section, and a wire clamping groove configured to limit a bonding wire is formed between every two adjacent limiting bumps.

11. The contact connector according to claim 9, wherein the metal elastic sheet comprises a weld leg portion configured to be welded to a circuit board of the electronic device, and the weld leg portion extends away from the fixed section from an end of the fixed section to protrude out of the substrate.

12. The contact connector according to claim 1, wherein the metal elastic sheet further comprises a simple support section, the simple support section comprises a first segment and a second segment connected with each other, the first segment extends away from the fixed section from an end of the free section, the second segment is bent from an end of the first segment towards the second side and extends towards the fixed section, and the second segment is configured to support the electronic device to provide the connection contact with force towards the first side.

13. The contact connector according to claim 1, wherein the substrate comprises a clamping portion, and the clamping portion is configured to match with the electronic device in a limiting mode.

14. An electronic device, comprising:
a contact connector comprising a substrate and a metal elastic sheet, wherein the substrate comprises a first side and a second side opposite to each other, the metal elastic sheet comprises a fixed section and a free section connected with each other, the fixed section is fixed to the substrate, the free section comprises a connection contact, the substrate comprises a through hole penetrating through the first side and the second side, the connection contact penetrates through the through hole to protrude out of the first side, and the second side comprises a mounting portion configured to assemble with the electronic device,
wherein the substrate comprises a hollowed-out portion and a boss located at one end of the hollowed-out portion, the free section is located at the hollowed-out portion, and the boss protrudes from the first side facing away from the second side and comprises the through hole.

15. The electronic device according to claim 14, wherein the contact connector comprises a plurality of metal elastic sheets comprising the metal elastic sheet, the plurality of metal elastic sheets are arranged at intervals, connection contacts of the plurality of metal elastic sheets are colinear, fixed sections of the plurality of metal elastic sheets are arranged in parallel, and the free section and the fixed section of at least one of the metal elastic sheets are arranged with an obtuse angle therebetween.

16. The electronic device according to claim 15, wherein the plurality of the metal elastic sheets comprise three metal elastic sheets comprising a middle metal elastic sheet and two side metal elastic sheets located on two sides of the middle metal elastic sheet, an included angle between the free section and the fixed section of the middle metal elastic sheet is 0°, and an included angle between the free section and the fixed section of a side metal elastic sheet is an obtuse angle.

17. The electronic device according to claim 14, wherein the contact connector comprises a plurality of metal elastic sheets comprising the metal elastic sheet, the plurality of metal elastic sheets are arranged at intervals, connection contacts of the plurality of metal elastic sheets are colinear, fixed sections of the plurality of metal elastic sheets are arranged in parallel, and the free section and the fixed section of at least one of the metal elastic sheets are arranged with an acute angle therebetween.

18. The electronic device according to claim 17, wherein the plurality of the metal elastic sheets comprise three metal elastic sheets comprising a middle metal elastic sheet and two side metal elastic sheets located on two sides of the middle metal elastic sheet, an included angle between the free section and the fixed section of the middle metal elastic sheet is 0°, and an included angle between the free section and the fixed section of a side metal elastic sheet is an acute angle.

19. The electronic device according to claim 14, wherein mounting portions are disposed on two opposite side portions of the substrate respectively, the mounting portions comprise glue accommodating grooves, the glue accommodating grooves are concave from the second side to the first side and extend in a direction parallel to a length direction of the metal elastic sheet, and the glue accommodating grooves are configured to accommodate an adhesive to fix the substrate and the electronic device.

* * * * *